United States Patent
Pappalardo et al.

(10) Patent No.: US 7,095,268 B2
(45) Date of Patent: Aug. 22, 2006

(54) SINGLE-STAGE AND MODULAR MULTI-STAGE CLOCK-BOOSTER

(75) Inventors: Domenico Pappalardo, Gravina di Catania (IT); Carmelo Ucciardello, Catania (IT); Gaetano Palumbo, Catania (IT); Paolo Scalisi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 47 days.

(21) Appl. No.: 11/033,184

(22) Filed: Jan. 11, 2005

(65) Prior Publication Data

US 2006/0152273 A1    Jul. 13, 2006

(51) Int. Cl.
*G05F 1/10* (2006.01)
*G05F 3/02* (2006.01)

(52) U.S. Cl. ...................................... 327/536
(58) Field of Classification Search ................ 327/530, 327/534–537, 541, 543, 589; 363/59–60
See application file for complete search history.

(56) References Cited

U.S. PATENT DOCUMENTS

| | | | | |
|---|---|---|---|---|
| 6,496,055 B1 * | 12/2002 | Li | ............................. | 327/536 |
| 6,650,569 B1 * | 11/2003 | Angelica et al. | ....... | 365/185.18 |
| 6,677,806 B1 * | 1/2004 | Bloch | ......................... | 327/536 |
| 6,781,440 B1 * | 8/2004 | Huang | ......................... | 327/537 |
| 6,946,899 B1 * | 9/2005 | Myono | ........................ | 327/536 |
| 6,970,035 B1 * | 11/2005 | Tanimoto | .................... | 327/536 |
| 2003/0174010 A1 | 9/2003 | Pappalardo et al. | ........ | 327/536 |

* cited by examiner

*Primary Examiner*—My-Trang Nu Ton
(74) *Attorney, Agent, or Firm*—Lisa K. Jorgenson; Allen, Dyer, Doppelt, Milbrath & Gilchrist, P.A.

(57) ABSTRACT

A single-stage clock booster produces a boosted clock voltage on an output node that is a multiple of a supply voltage. The single-stage clock booster includes a pump capacitor having a first terminal being driven by a first control phase signal. A first switch is controlled by the boosted clock voltage for connecting a second terminal of the pump capacitor to the supply voltage during a charge phase. A second switch connects the second terminal of the pump capacitor to the output node during a boosted clock voltage output phase. A switching circuit alternately connects a control node of the second switch to the supply voltage and to the first terminal of the pump capacitor. The switching circuit is driven by a second control phase signal. A third switch is controlled by a third control phase signal for connecting the output node to a reference voltage during the charge phase.

20 Claims, 19 Drawing Sheets

SINGLE-STAGE AND MODULAR MULTI-STAGE CLOCK-BOOSTER

FIELD OF THE INVENTION

The present invention relates to integrated circuits, and in particular, to a single-stage and a multi-stage charge pump voltage booster.

BACKGROUND OF THE INVENTION

Voltage boosters are integrated in memory devices and other type devices to provide higher voltages than the supply voltage. Higher voltages are necessary, for example, in non-volatile memory devices for erasing and writing data, for enhancing the driving conditions (overdriving) of output power devices and other purposes.

Voltage boosters are also used for generating a boosted clock signal for driving the switches of a charge pump. A boosted clock is necessary for allowing the switches that connect in parallel a pump capacitor with a tank capacitor of a charge pump to remain on as long as both capacitors are at the same voltage.

Voltage boosters use a relatively large capacitance $C_{Tot}$ for generating a large voltage. For a multi-stage voltage booster having N stages, the output voltage $V_{Out}$ is given by the following equation:

$$V_{Out} = (N+1) \cdot V_{dd} - N^2 \cdot \frac{I_L}{f \cdot C_{Tot}}$$

where $V_{dd}$ is the supply voltage of the voltage booster, $I_L$ is the current to be delivered, and f is the switching frequency of the voltage booster.

To reduce the silicon area occupied by a voltage booster for the same output voltage $V_{Out}$, it is necessary to reduce its capacitance $C_{Tot}$ and to increase the switching frequency of its switches. Voltage boosters used for generating a boosted clock signal for a charge pump are usually called clock-boosters, and this expression will be used below.

A common clock-booster is depicted in FIG. 1. It is substantially composed of two identical sub-circuits each generating a respective boosted phase $V_{OUT1A}$ and $V_{OUT1B}$. Each sub-circuit has an NMOS transistor controlled by the boosted phase output by the other sub-circuit, and a PMOS transistor controlled by a respective input control phase $V_{IN}$, $\overline{V_{IN}}$. The voltage drops on the PMOS transistor may surpass the supply voltage $V_{dd}$ and thus, these transistors should be high-voltage transistors. That is, each high-voltage transistor has a gate oxide of increased thickness and with an increased channel length.

The clock-booster should not be used for frequencies higher than 10 MHz. At higher frequencies, the relatively large parasitic capacitances that affect the high-voltage transistors HV strongly limit performance.

Published U.S. patent application no. 2003/0174010, which is assigned to the assignee of the invention and is incorporated herein by reference in its entirety, discloses an improved clock-booster, as illustrated in FIG. 2. The clock-booster has a reduced silicon area requirement. One of the high-voltage transistors of FIG. 1 is substituted with a low-voltage transistor. The output node is pre-charged with the voltage $V_{dd}$, and the output voltage is held before the output node is discharged.

This configuration saves silicon area and reduces current consumption up to a frequency of about 10 MHz. At higher frequencies, it is necessary to have a larger high-voltage MOS transistor P2 for increasing its conductance. In doing so its parasitic capacitance is also inevitably increased, and the advantages compared to the clock-booster of FIG. 1 are jeopardized. Indeed, in the clock-booster of FIG. 1 for 50 MHz the pass-transistor that connects the capacitance C to the output node should have a channel of 400 µm/0.8 µm, while in the clock-booster of FIG. 2 it should have a channel of 1500 µm/0.8 µm.

Low-voltage transistors have a relatively small capacitance, and therefore, are perfectly suited for functioning at a frequency of 50 MHz or above. Therefore, a clock-booster made exclusively with low-voltage transistors would show good performances even at relatively high frequencies. Unfortunately, as discussed above, known clock-boosters rely on the use of a certain number of high-voltage transistors.

SUMMARY OF THE INVENTION

An object of the invention is to provide a cost efficient architecture of a single-stage clock-booster that uses low-voltage transistors for generating a boosted clock voltage that is double the supply voltage.

This and other objects, advantages and features in accordance with the invention are provided by biasing the control nodes of each switch with the voltage present on certain internal nodes of the clock-booster, purposely chosen for limiting the voltage drop on the switch to at most the supply voltage.

A certain number of single-stage clock boosters may be connected in cascade for forming a multi-stage clock-booster. In this case, each stage but the first of the cascade contains one high-voltage transistor. Therefore, it is possible to generate an arbitrarily high boosted clock voltage with a reduced number of high-voltage transistors, thus achieving a savings in silicon area.

BRIEF DESCRIPTION OF THE DRAWINGS

FIGS. 6c and 6d are schematic diagrams of preferred embodiments of certain circuits of the two-stage clock-booster of FIG. 6a;

FIG. 7 is a graph showing the timing of the control phases for the two-stage clock-booster of FIG. 6a;

FIG. 10 is a timing diagram of the main voltages on the nodes of the circuit of FIG. 6a;

DETAILED DESCRIPTION OF THE PREFERRED EMBODIMENTS

Figure 3:
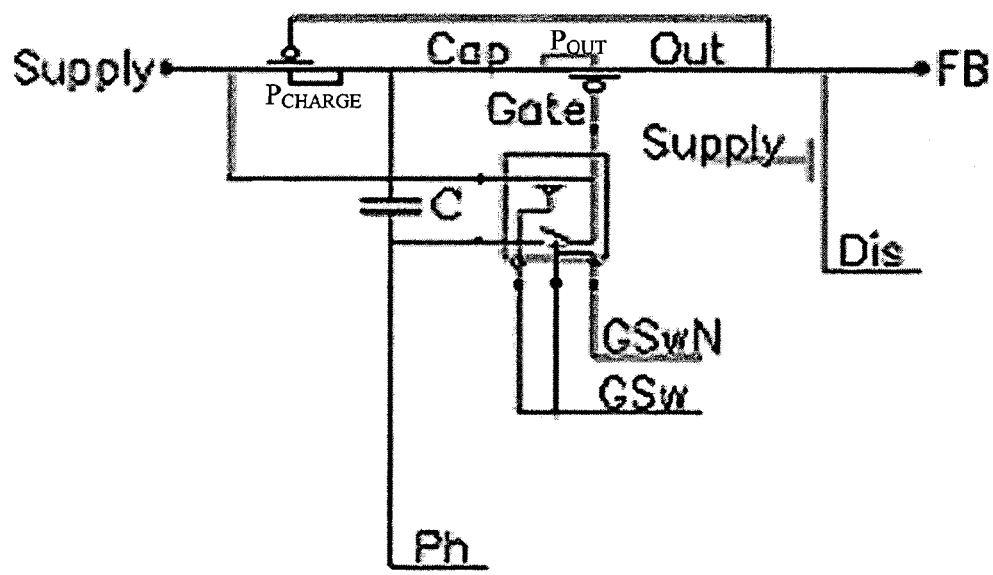
FIG. 3 is a schematic diagram of a single-stage clock-booster according to the invention.

An embodiment of a single stage clock-booster in accordance with the invention is depicted in FIG. 3. It is composed exclusively of low-voltage transistors, and is controlled by the control phases $P_H$, $G_{Sw}$ and $D_{IS}$ for pre-charging the output node OUT and holding the output voltage before the output node is grounded.

The output PMOS transistor $P_{OUT}$ is controlled during the operation cycle by the maximum voltage of the clock-booster of the circuit (i.e., the supply $V_{dd}$ on the supply SUPPLY) and by the voltage on a first plate of the pump capacitor C. This structure makes the architecture suitable to be replicated any number N of times for forming an N-stage clock-booster deploying a very limited number of high-voltage transistors, as will be described below.

Figure 4:
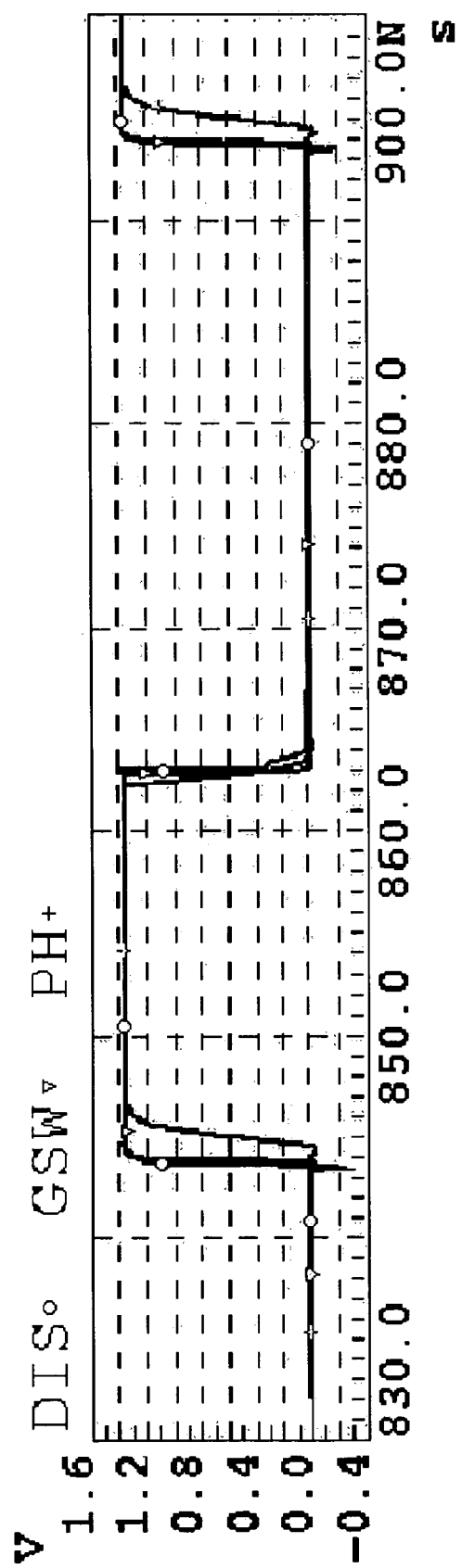
FIG. 4 is a timing diagram of the control phases for the clock-booster of FIG. 3.

FIG. 4 shows a sample timing diagram of the control phases of the circuit of FIG. 3. The control phase $P_H$ switches high a few nanoseconds after the leading edges of the phases $D_{IS}$ and $G_{Sw}$ for boosting the output voltage after the pump capacitor C is connected to the output node OUT of the clock booster.

Figure 1:
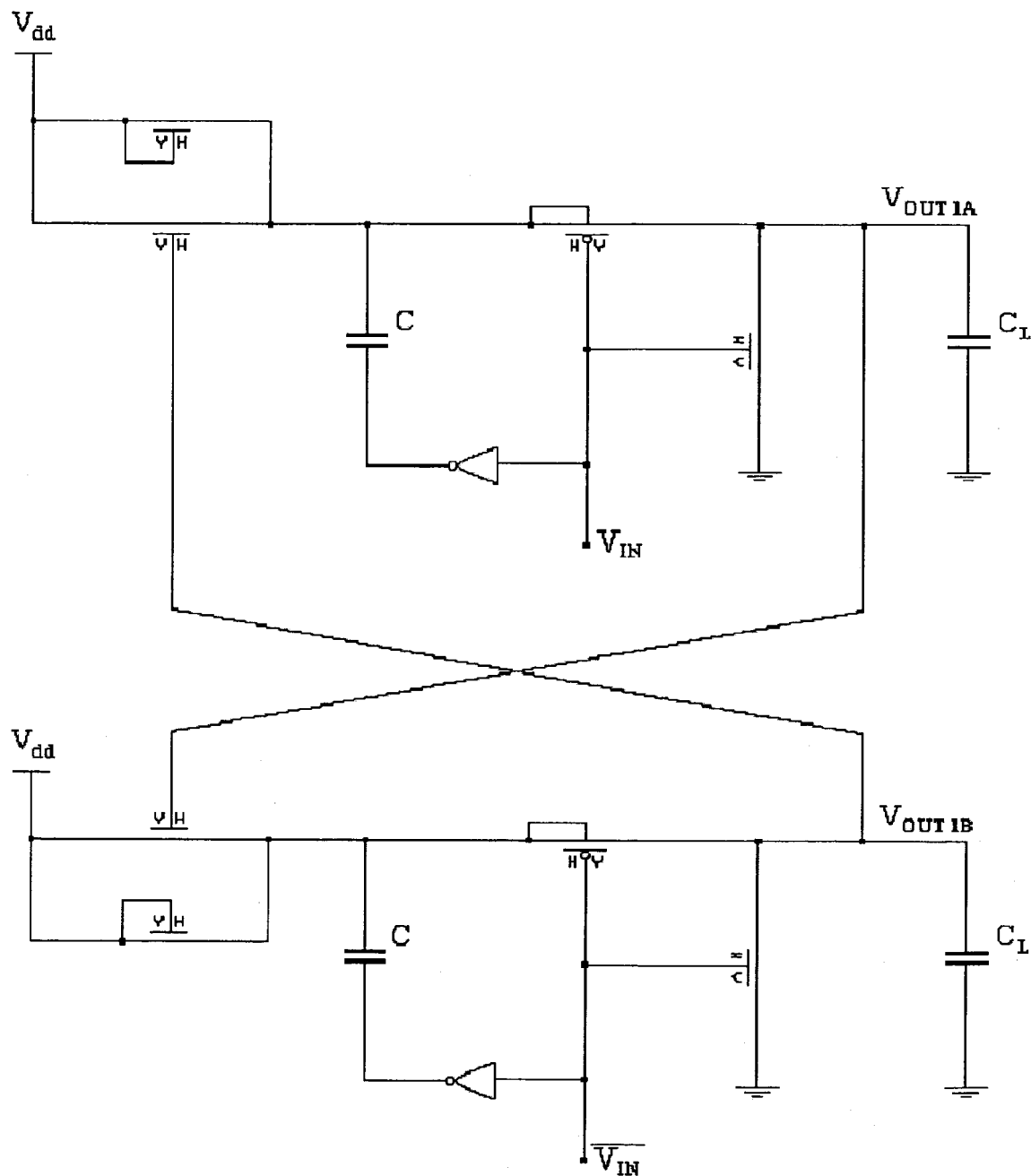
FIGS. 1 and 2 are schematic diagrams of two prior art clock-boosters according to the prior art.
Figure 2:
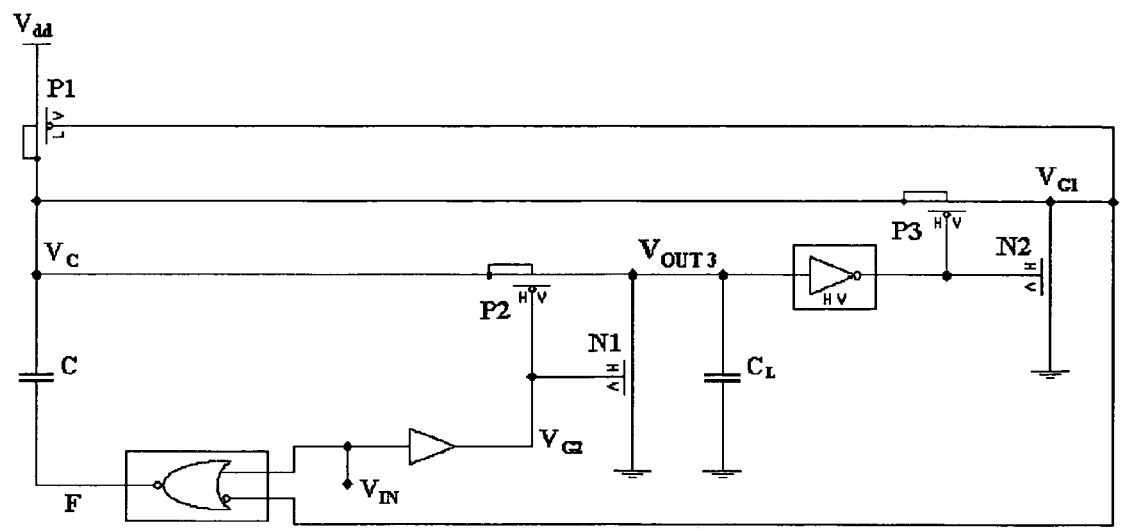
Figure 5:
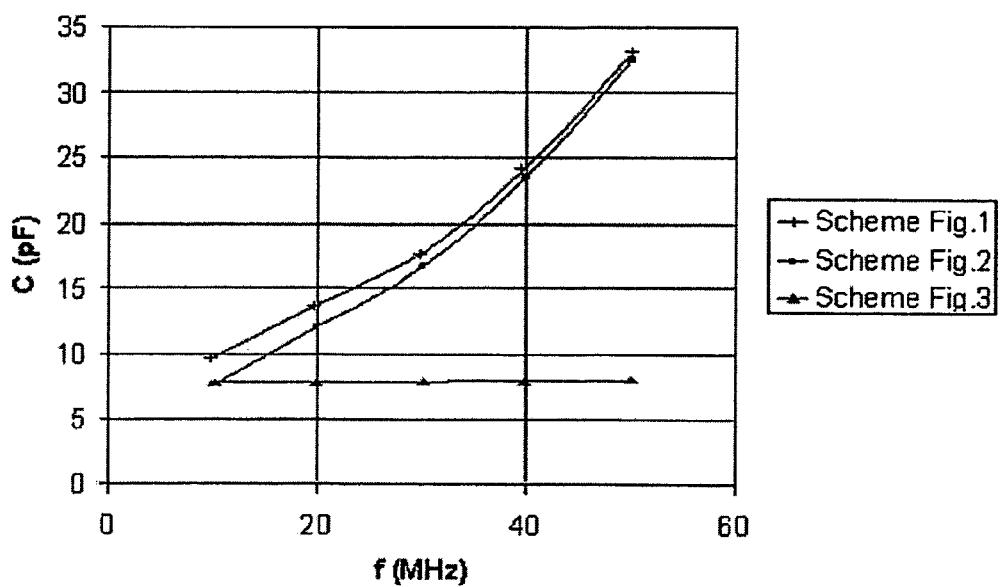
FIG. 5 is a graph comparing the capacitances of the clock-boosters of FIGS. 1 and 3.

FIG. 5 compares the required capacitance C of the clock-booster of FIG. 3 with that of the clock-boosters of FIGS. 1 and 2 for different operating frequencies. It is evident that the clock-booster of the invention consumes the least area because it requires the smallest capacitance C. Typically, the channel dimensions of the transistor that couples the capacitor C to the output node are 100 μm/0.18 μm.

The invention will now be described in more detail for the embodiment of FIG. 6a relative to a two-stage clock booster, including the relative generator of the control phases. Possible detail embodiments of certain circuit blocks of the general diagram of FIG. 6a are illustrated in FIGS. from 6b to 6d.

Figure 6B:
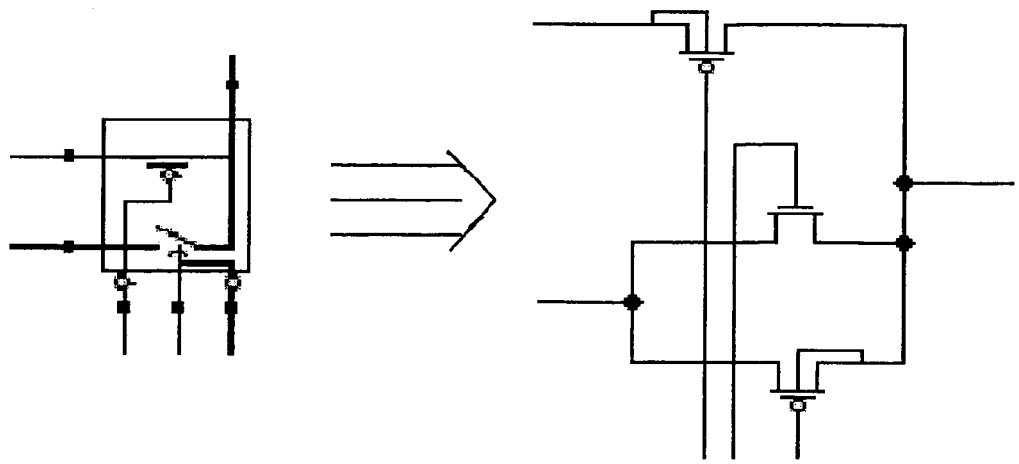
FIG. 6b is a schematic diagram of a preferred embodiment of a switch used in the clock-boosters according to the invention.

The switch of FIG. 6b is composed of two complementary MOS transistors in parallel, controlled by opposite control phases $G_{Sw}$ and $G_{SwN}$, and of a PMOS transistor controlled by the first of the opposite control phases $G_{Sw}$. It is possible to form the switch using junction transistors (BJTs), even if such an embodiment is less preferable because of the non-negligible currents circulating through the control base terminal of BJTs, and/or to invert the type of conductivity of the transistors of the clock-booster of FIG. 6a and the polarity of the supply voltage and of the control phases.

Figure 6A:
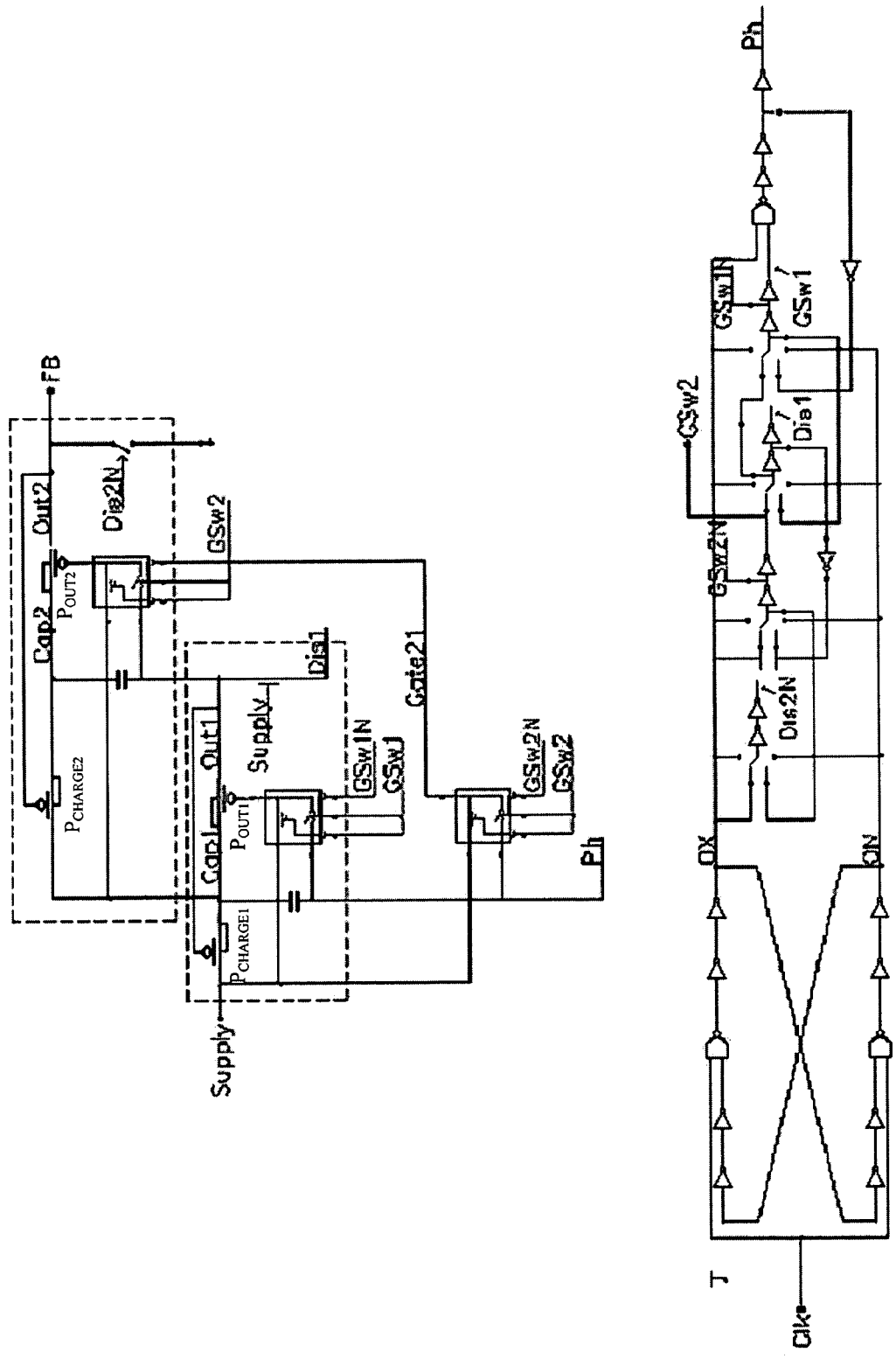
FIG. 6a is a schematic diagram of a two-stage clock-booster according to the invention.
Figure 6C:
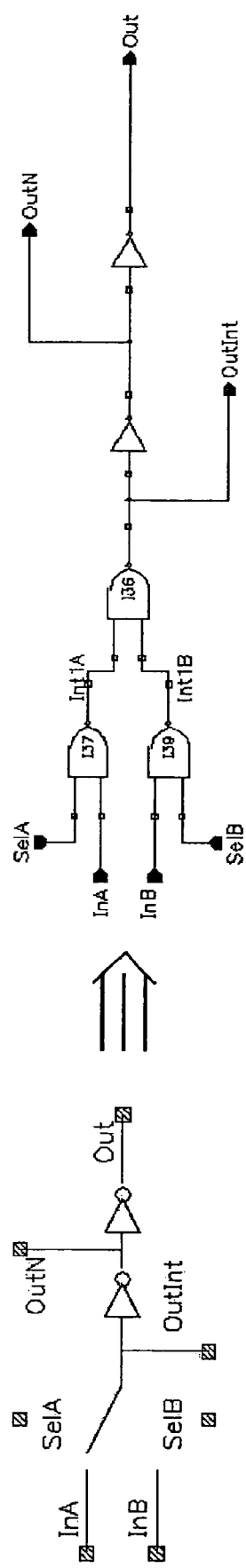
Figure 6D:

In the sample embodiment of FIG. 6a, the clock-booster is composed of two stages as shown in FIG. 3 in cascade. The two stages are not identical, because the NMOS transistor that grounds the output node $O_{UT}2$ of the last stage of the cascade should be a high-voltage transistor, while the output node of the first stage $O_{UT}1$ is grounded by a low-voltage NMOS because it should withstand only the supply voltage.

Figure 8:
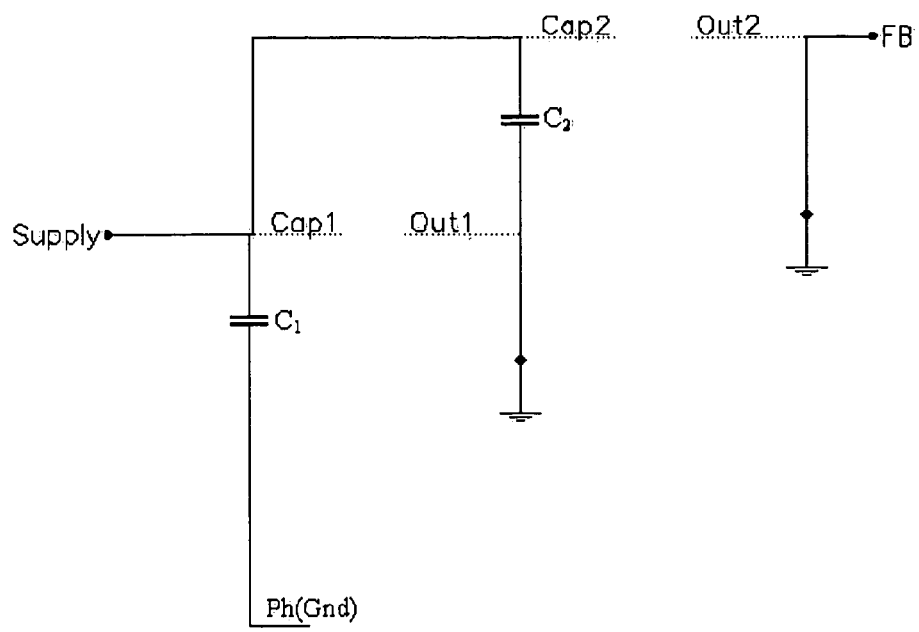
FIGS. 8 and 9 are schematic diagrams of two equivalent circuits of the clock-booster of FIG. 6a in two successive phases of operation.
Figure 9:
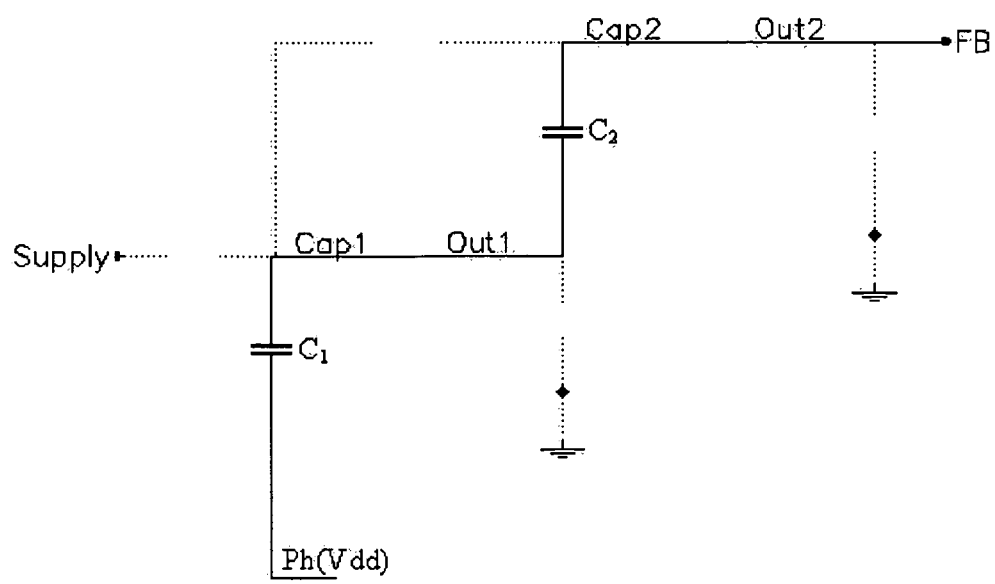

The functioning of the clock-booster of FIG. 6a can be summarized as follows. During a clock half-period both pump capacitors are connected between the supply $V_{dd}$ and a common ground node, as shown in FIG. 8, and the output node $O_{UT}2$ is grounded. During the other clock half-period, the pump capacitors are connected in series, as shown in FIG. 9, and the voltage on the output node $O_{UT}2$ is three times the supply voltage.

The output PMOS transistor of the second stage $P_{OUT2}$ may be controlled either by the supply voltage or by the output voltage of the first stage. This ensures that the voltage drop on the output PMOS transistor of the second stage is not larger than the supply voltage.

In fact, when the two pump capacitors are being charged, the output node of the clock-booster is grounded. Thus, the output PMOS transistor of the second stage $P_{OUT2}$ is subject to the supply voltage. Similarly, when the two pump capacitors are connected in cascade for producing the boosted voltage, the control node of the output PMOS transistor $P_{OUT2}$ is connected to the node at the lowest potential of the pump capacitor of the same stage, that is, at the voltage generated by the first stage. The voltage generated by the first stage differs from the output voltage of the clock-booster at most by a value corresponding to the supply voltage $V_{dd}$. Thus, the output PMOS transistor of the second stage $P_{OUT2}$ can be a low-voltage transistor because it is always turned on and off under safe conditions for the integrity of its gate oxide.

By a similar reasoning, it is possible to demonstrate that also the charge PMOS transistors, that is, the PMOS transistors that connect the pump capacitors to the supply node, are turned on and off in an intrinsically safe way for their gate oxides. When all capacitors are being charged at the supply voltage $V_{dd}$, the output node of each stage is grounded and each charge PMOS transistor is subject to the supply voltage. When the pump capacitors are connected in series, each charge PMOS transistor is subject to the voltage difference between the voltage of the output node of the stage it belongs to and the voltage on the relative supply node, that is, at most the supply voltage. Therefore, all charge transistors and all output transistors may be low-voltage transistors, and this allows a substantial silicon area to be saved.

Figure 7:
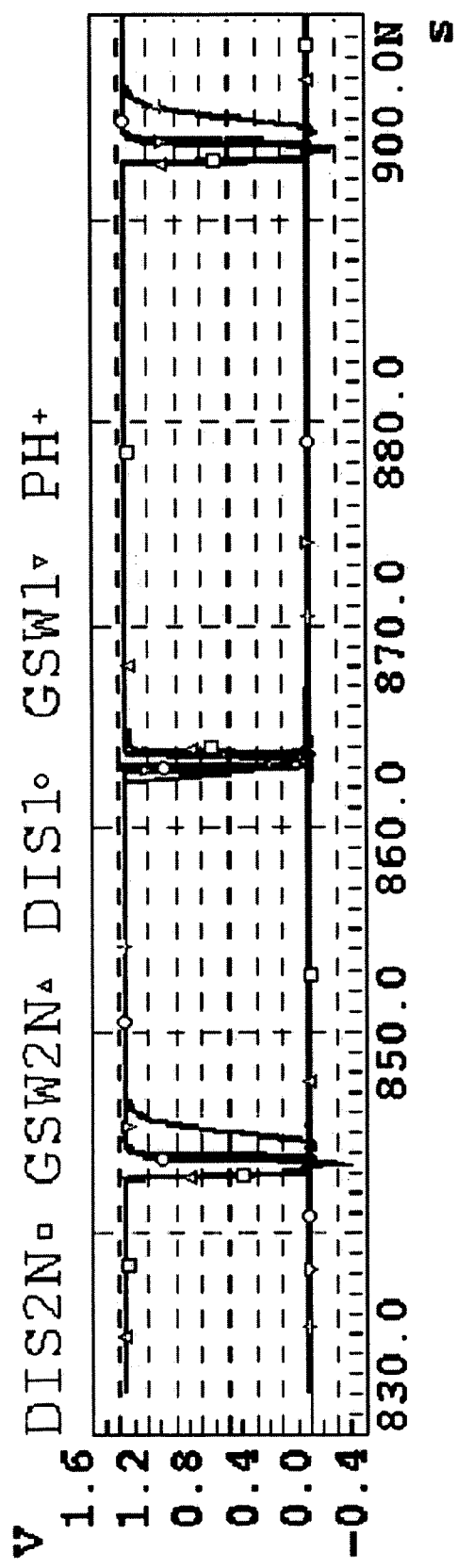
Figure 10:
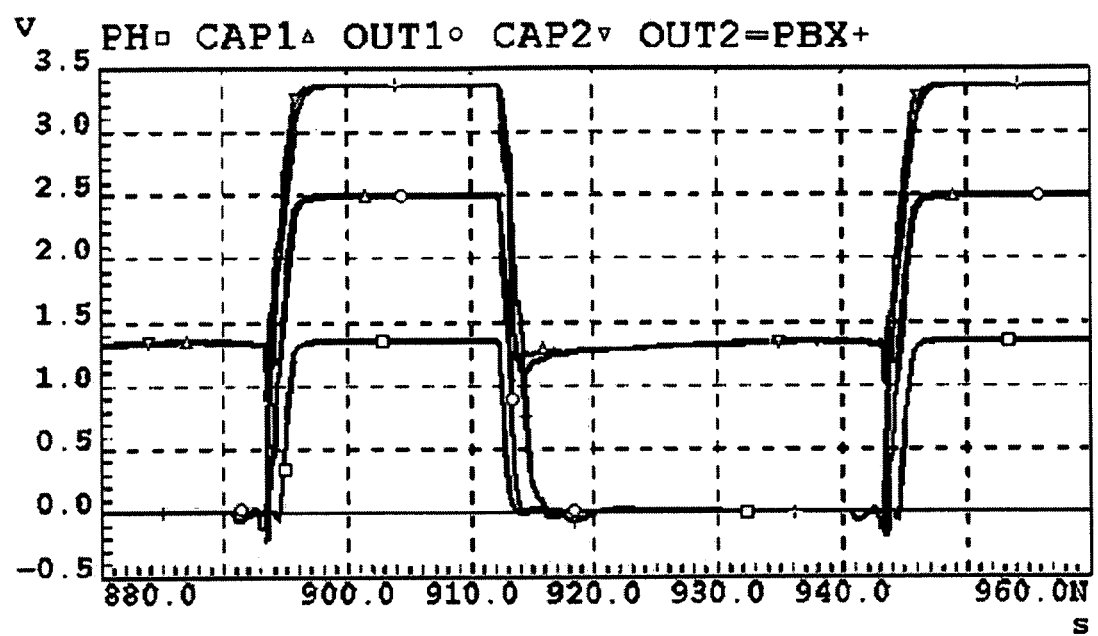

The evolution in time of the control phases and the voltages on the main nodes of the two-stage clock-booster of FIG. 6a are shown in FIGS. 7 and 10, respectively, while FIGS. from 11 to 14b illustrate how the two-stage clock-booster of the invention generates the boosted voltage using only low-voltage transistors. The switches turned on are drawn with solid lines, while the switches turned off are drawn with dotted lines.

Figure 11A:
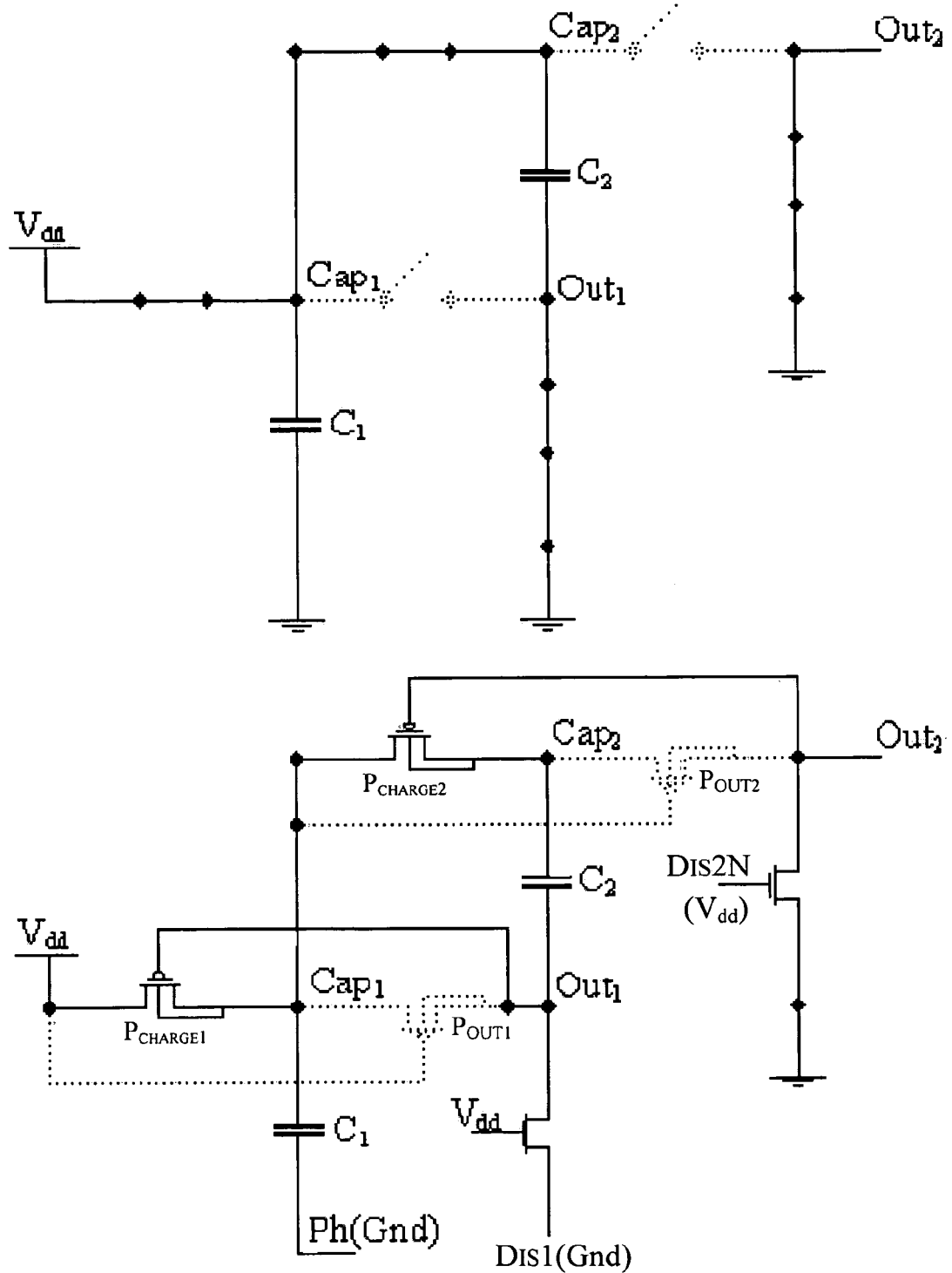
FIGS. 11a, 12a, 13a and 14a are schematic diagrams of equivalent circuits of the clock-booster of FIG. 6a in various phases of operation.
Figure 11B:
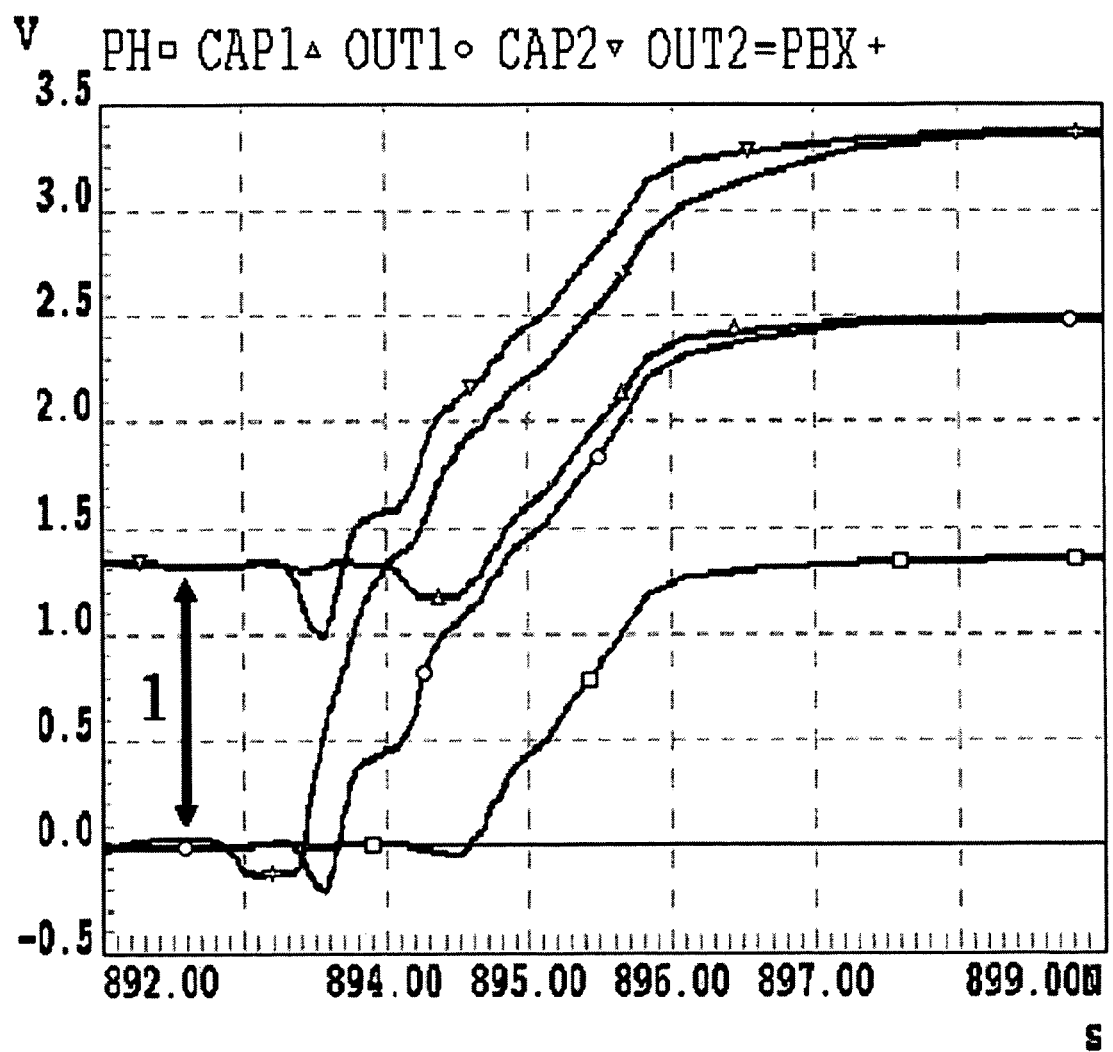
FIGS. 11b, 12b, 13b and 14b show timing diagrams of the main voltages of the circuits of FIGS. 11a, 12a, 13a and 14a, respectively.

The time interval in which the output voltage is switched high will be considered first. Before this happens, the switches are configured as shown in FIG. 11a with the two capacitors $C_1$ and $C_2$ of the two stages connected in parallel between the supply node and ground.

Figure 12A:
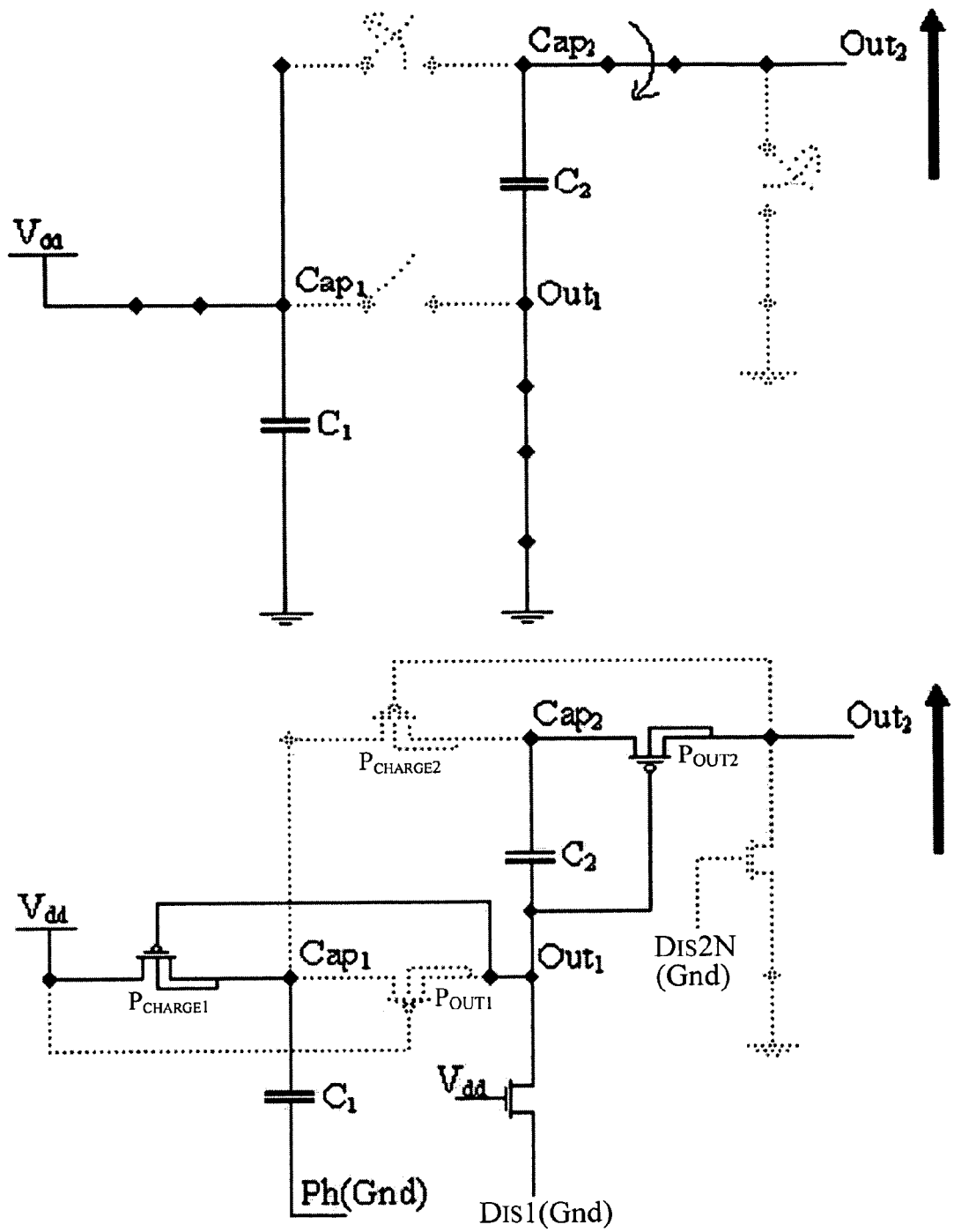
Figure 12B:
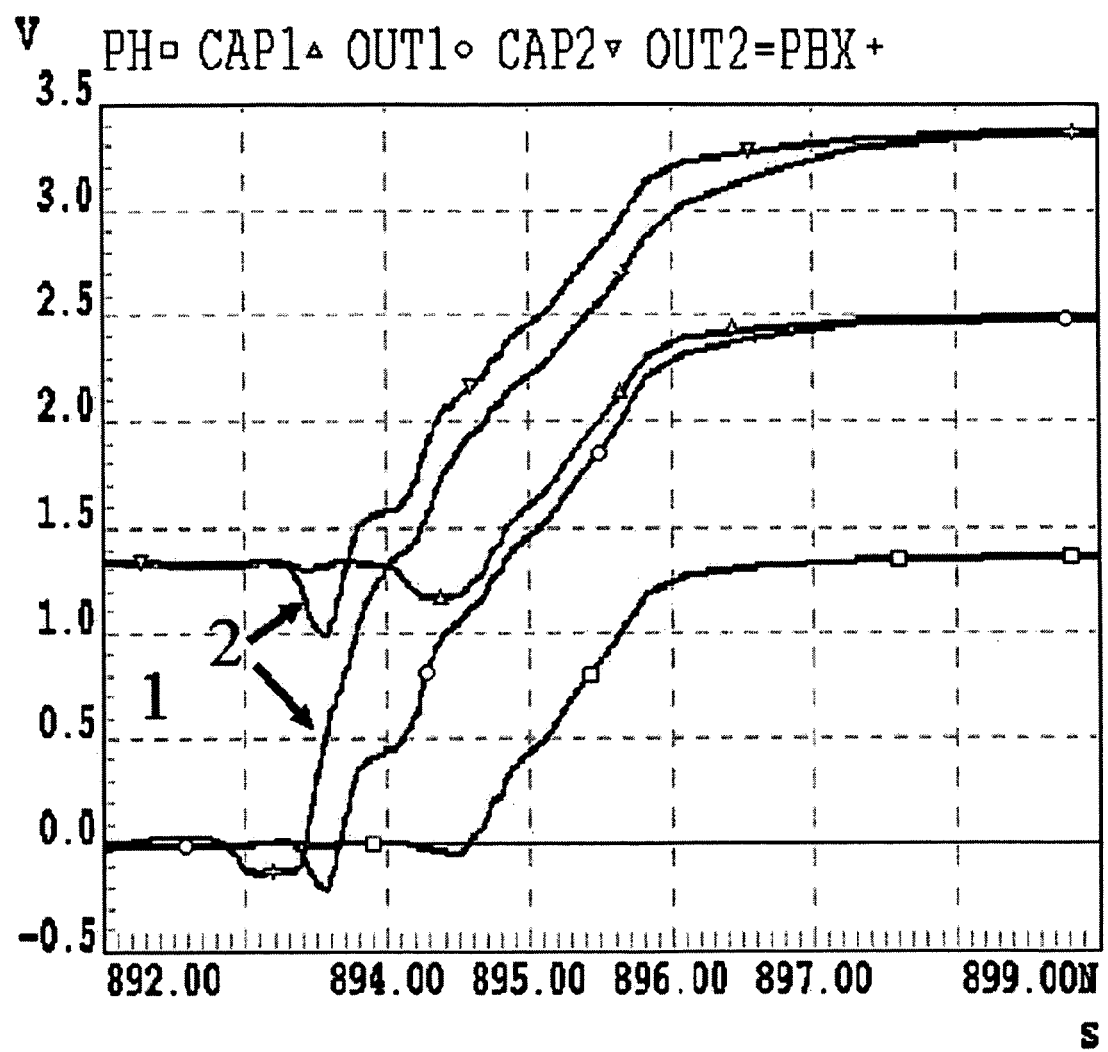

After a short time interval, the capacitor $C_2$ is disconnected from the supply, as shown in FIG. 12a, and is connected to the output node $O_{UT_2}$. The output node $O_{UT_2}$ is thus pre-charged at the voltage on the capacitor $C_2$ as shown by the arrows in the timing diagram of FIG. 12b.

The voltage on the node $O_{UT_1}$ drops momentarily below ground because when the switch $P_{OUT2}$ turns on, the node $OUT_2$ is pre-charged by the capacitor $C_2$. The pre-charge current flows from the node at the potential of the phase $D_{IS_1}$ (which is the ground potential), flows through the NMOS transistor controlled by the control phase $D_{IS_1}$, through the pump capacitor $C_2$ and finally through the PMOS transistor $P_{OUT2}$. This current causes a voltage drop on the NMOS transistor controlled by the phase $D_{IS_1}$, and thus the voltage on the node $O_{UT_1}$ becomes momentarily negative.

Figure 13A:
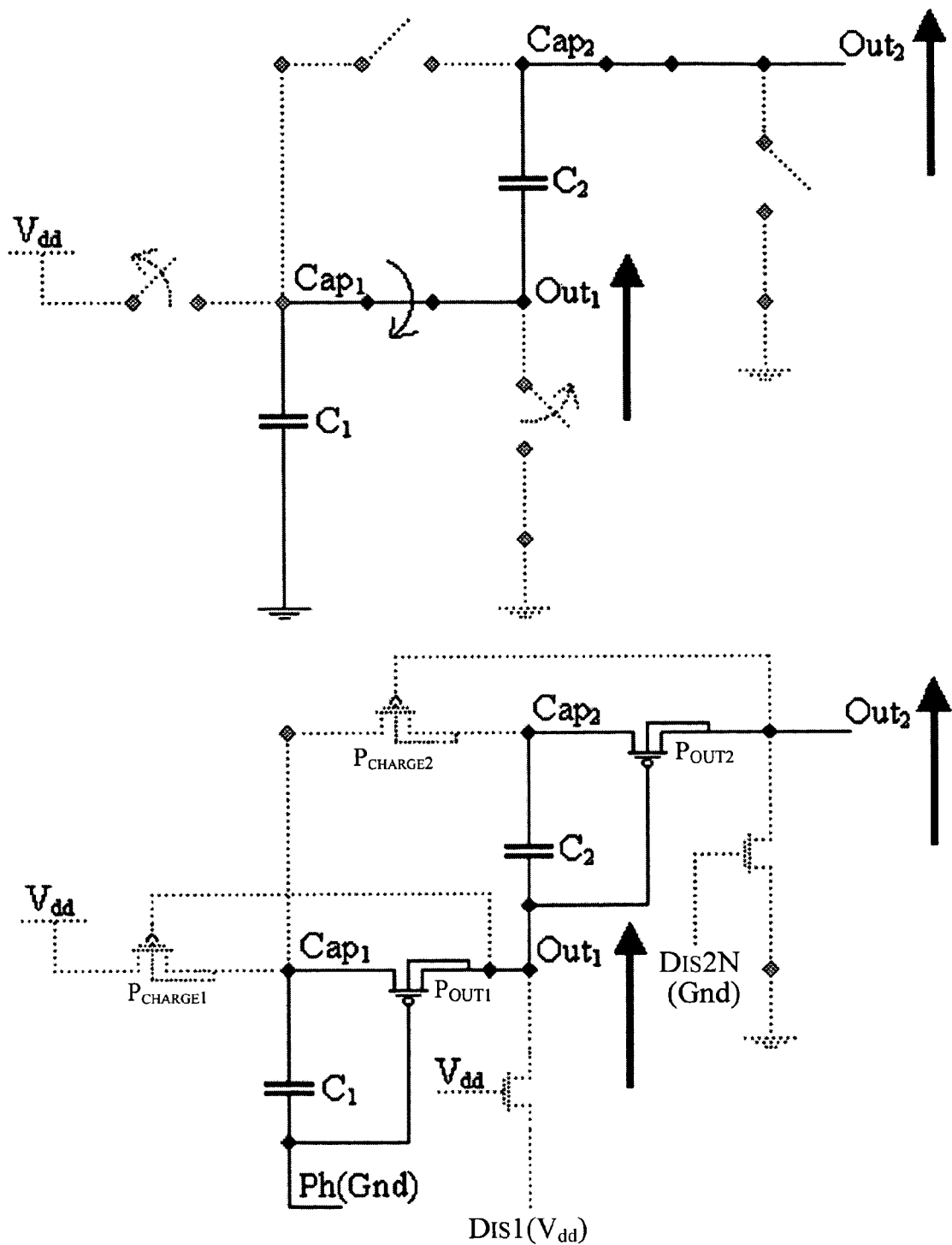
Figure 13B:
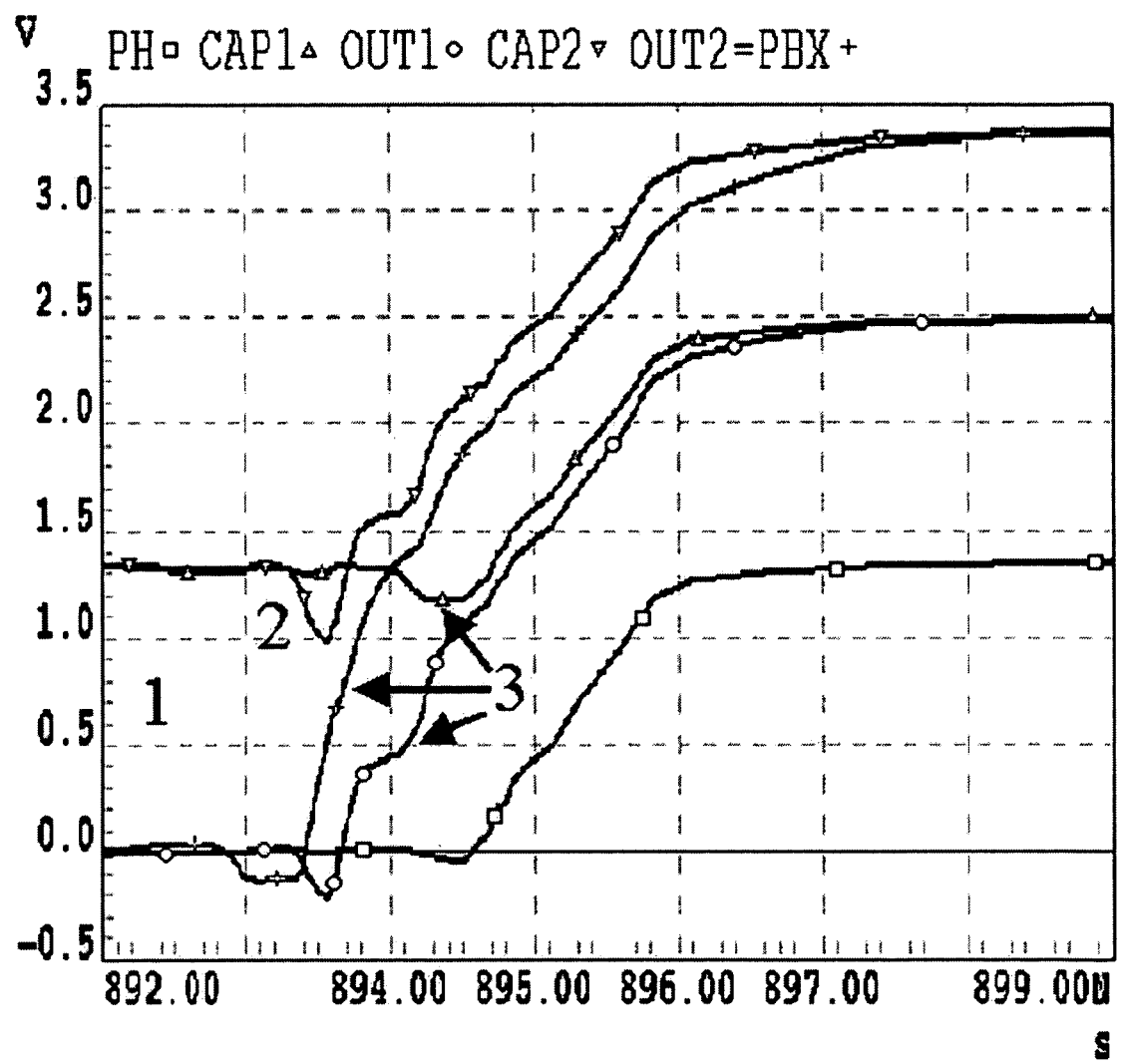

Successively, the capacitor $C_2$ is connected in series with the capacitor $C_1$, previously charged with the supply voltage $V_{dd}$, as shown in FIG. 13a, and the NMOS transistor that grounds the node $O_{UT_1}$ is turned off. The gate node of the NMOS transistor is always at the supply voltage $V_{dd}$, and the NMOS transistor is turned off by applying the supply voltage on its source node. Therefore, the NMOS transistor is diode-connected and the voltage on the node $O_{UT_1}$ is practically kept at the voltage $V_{dd}$. Therefore, the voltage on the output node $O_{UT_2}$ rises to twice the supply voltage, as shown in FIG. 13b, and the node $O_{UT_1}$ tends to reach the voltage on the capacitor $C_1$.

Figure 14A:
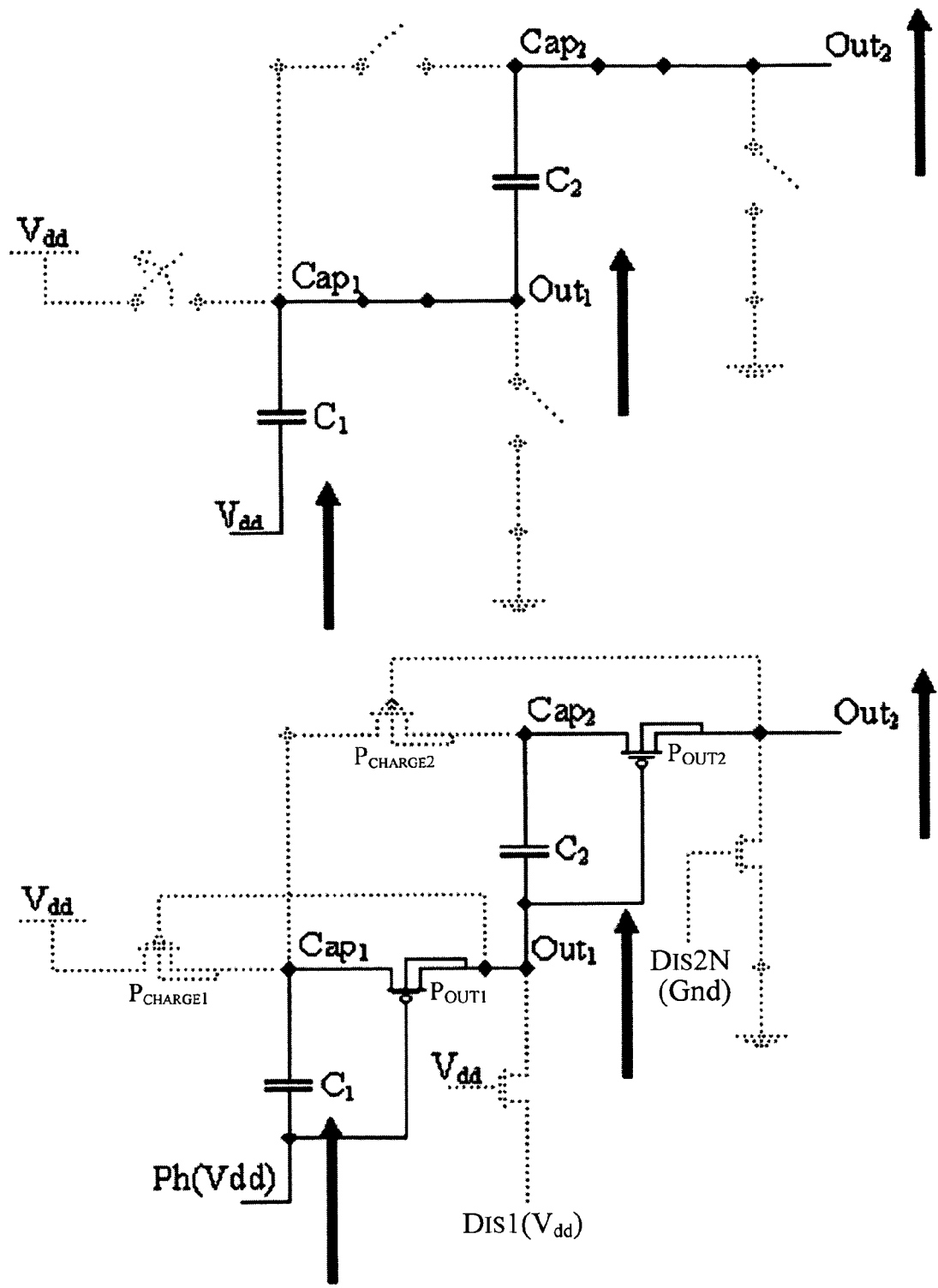
Figure 14B:
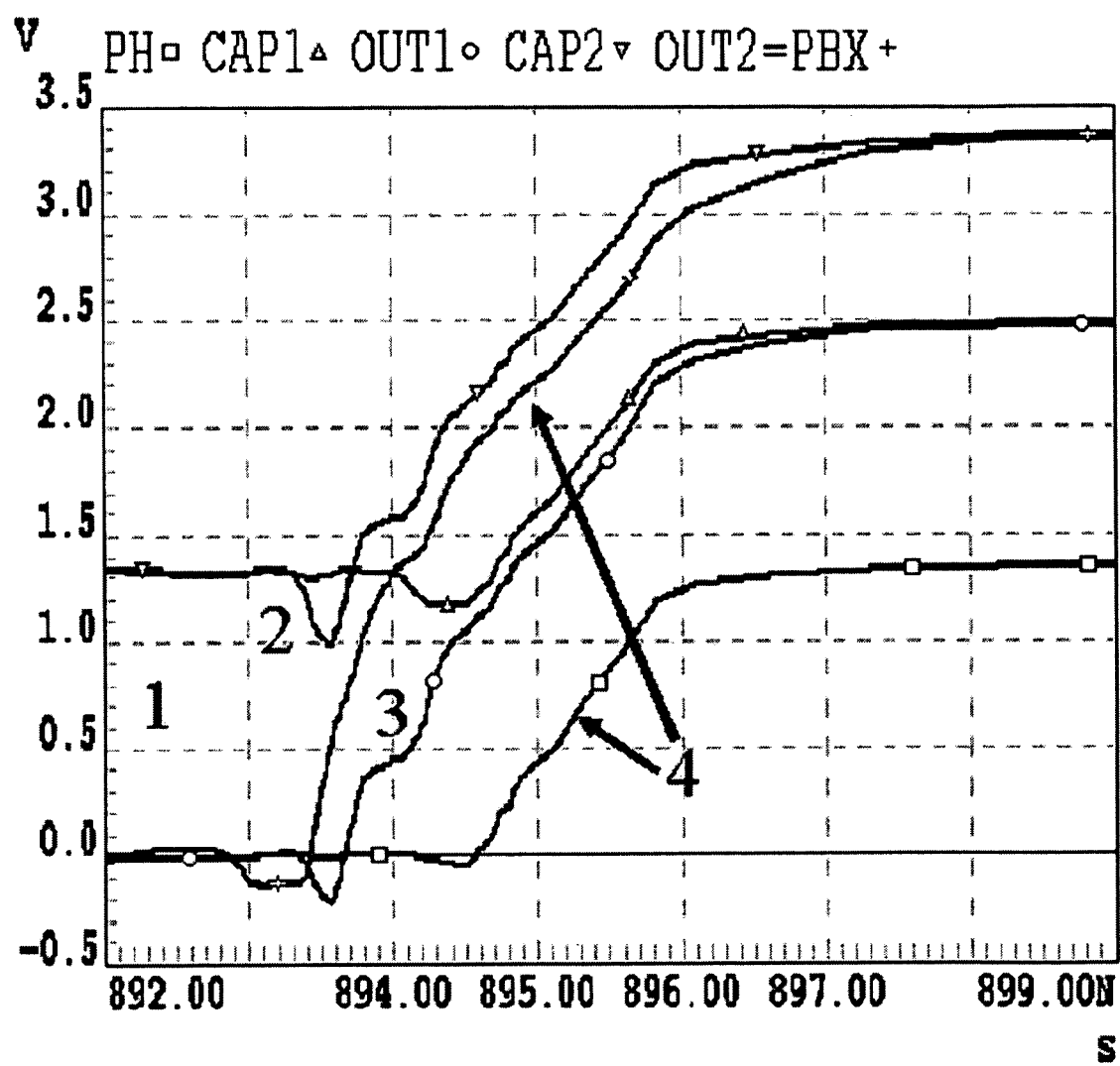

Finally, as shown in FIG. 14a, the control phase $P_H$ is switched high and the voltage on the output node $O_{UT_2}$ becomes three times the supply voltage, as shown in FIG. 14b. In the successive clock half-period, the output voltage is switched low by going through the same phases in a reverse order.

The only high-voltage transistor required by the clock-booster is the NMOS transistor that discharges the output node $O_{UT_2}$. It is impossible to substitute this high-voltage NMOS transistor with a corresponding low-voltage transistor because it should withstand a higher voltage than the supply voltage, and quickly grounds the output node at the trailing edge of each boosted clock pulse.

Figure 15:
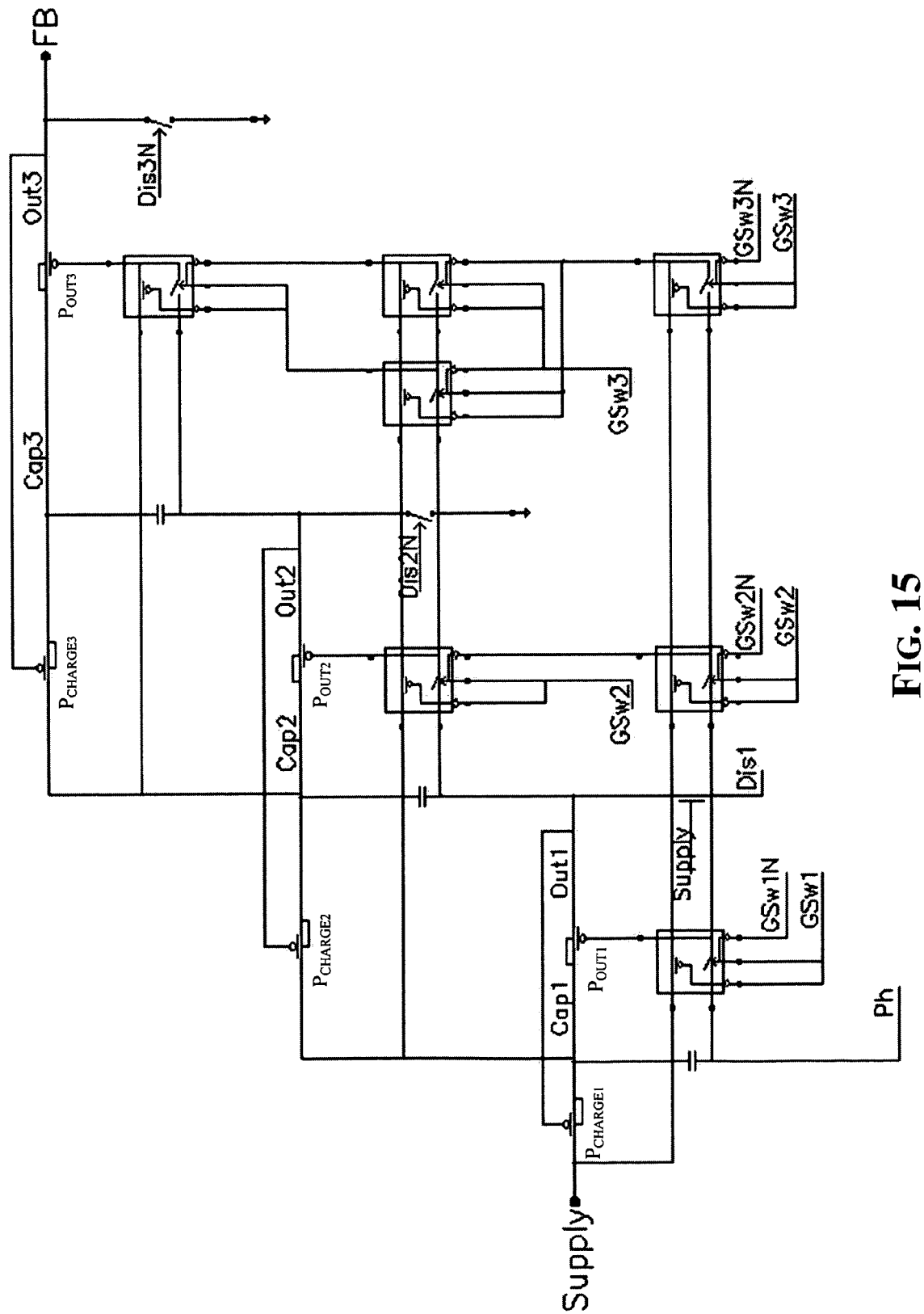
FIG. 15 is a schematic diagram of a three-stage clock-booster according to the invention.
Figure 16:
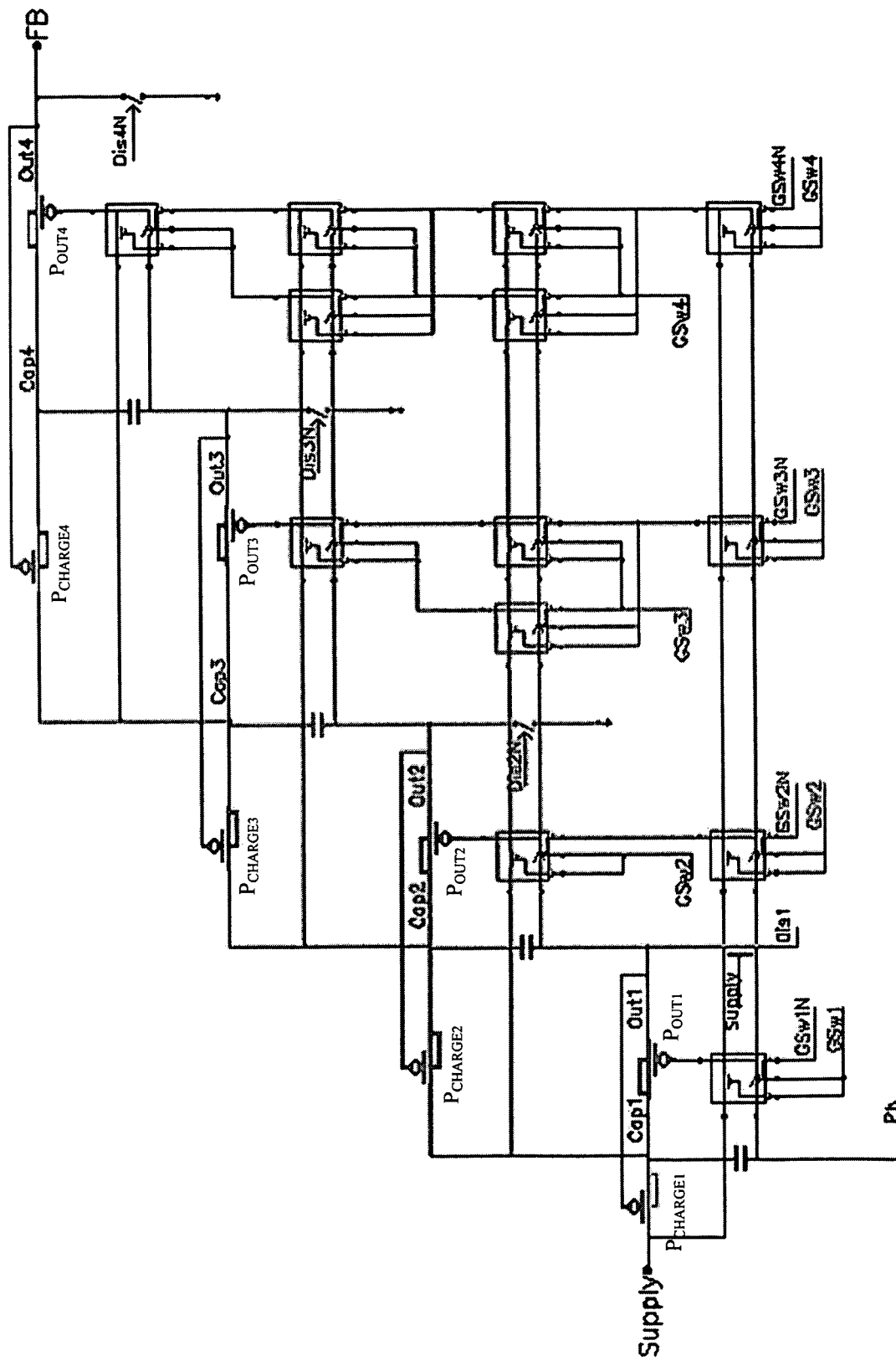
FIG. 16 is a schematic diagram of a four-stage clock-booster according to the invention.

Of course, a clock-booster according to the invention may be formed with any number of stages by connecting in cascade a plurality of single stages as the one depicted in FIG. 3. By way of illustration, FIGS. 15 and 16 show a three-stage and a four-stage clock-booster according to the invention. In these embodiments, the NMOS transistors that ground the output nodes $O_{UT_2}$, $O_{UT_3}$, $O_{UT_4}$ of the stages successive to the first stage in the cascade are properly designed high-voltage transistors because they withstand boosted voltages.

Referring now to FIGS. 3, 6a, 15 and 16, a skilled person will readily know how to form an N-stage clock-booster according to the invention. Moreover, by comparing the timing diagrams of FIGS. 4 and 7, the skilled person will immediately understand how the control phases of an N-stage clock-booster need to be generated.

That which is claimed is:

1. A single-stage clock booster for producing a boosted clock voltage on an output node that is a multiple of a supply voltage, the single-stage clock booster comprising:
   a pump capacitor having a first terminal being driven by a first control phase signal, and a second terminal;
   a first switch controlled by the boosted clock voltage for connecting the second terminal of said pump capacitor to the supply voltage during a charge phase;
   a second switch for connecting the second terminal of said pump capacitor to the output node during a boosted clock voltage output phase, said second switch having a control node;
   a switching circuit for alternately connecting the control node of said second switch to the supply voltage and to the first terminal of said pump capacitor, said switching circuit being driven by a second control phase signal;
   a third switch controlled by a third control phase signal for connecting the output node to a reference voltage during the charge phase; and
   a generator for generating the first, second and third control phase signals for alternately connecting the second terminal of said pump capacitor to the supply voltage and to the output node, and for connecting the first terminal of said pump capacitor to the reference voltage and to the supply voltage respectively.

2. A single-stage clock booster according to claim 1, wherein the reference voltage comprises ground.

3. A single-stage clock booster according to claim 1, wherein said first and second switches each comprise a low-voltage MOS transistor having a first type of conductivity; and wherein said third switch comprises a MOS low-voltage transistor having a second type of conductivity, said MOS transistor having the second type of conductivity comprising a gate terminal connected to a constant voltage, and a conducting terminal receiving the third control phase signal.

4. A single-stage clock booster according to claim 3, wherein said MOS transistor having the first type of conductivity comprises a PMOS transistor; and wherein said MOS transistor having the second type of conductivity comprises an NMOS transistor, with the conducting terminal thereof comprising a source terminal.

5. A single-stage clock booster according to claim 1, wherein said switching circuit comprises:
   first and second complementary transistors connected in parallel between the control node of said second switch and the first terminal of said pump capacitor, said first transistor being controlled by the second control phase signal and said second transistor being controlled by a negated replica of the second control phase signal; and
   a third transistor having a conductivity opposite to a conductivity to said first transistor and being controlled by the second phase control signal, said third transistor being connected between the control node of said second switch and a supply node receiving the supply voltage.

6. A two-stage clock-booster for producing a second boosted clock voltage on a second output node that is a multiple of a supply voltage, the two-stage clock-booster comprising:
   a first stage clock booster for producing a first boosted clock voltage on a first output node that is a multiple of the supply voltage, said first stage clock booster comprising
      a pump capacitor having a first terminal being driven by a first control phase signal, and a second terminal,
      a first switch controlled by the first boosted clock voltage for connecting the second terminal of said pump capacitor to the supply voltage during a charge phase,
      a second switch for connecting the second terminal of said pump capacitor to the first output node during a boosted clock voltage output phase, said second switch having a control node,
      a switching circuit for alternately connecting the control node of said second switch to the supply voltage and to the first terminal of said pump capacitor, said switching circuit being driven by a second control phase signal, and
      a third switch controlled by a third control phase signal for connecting the first output node to a reference voltage during the charge phase;
   a second stage clock booster connected in cascade to said first stage clock booster for producing the second boosted clock voltage on the second output node that is a multiple of the supply voltage, said second stage clock booster comprising a pump capacitor having a first terminal connected to the first output node of said first stage clock booster and being driven by the first boosted clock voltage, and a second terminal, a first switch controlled by the second boosted clock voltage for connecting the second terminal of said pump capacitor to the second terminal of said pump capacitor of said first stage clock booster during the charge phase, said first switch being connected to a supply node coinciding with the second terminal of said pump capacitor of said first stage clock booster, a second switch for connecting the second terminal of said pump capacitor to the second output node during the boosted clock voltage output phase, said second switch having a control node, a switching circuit for alternately connecting the control node of said second switch to the supply voltage and to the first terminal of said pump capacitor, said switching circuit being driven by the second control phase signal, a third switch controlled by the third control phase signal for connecting the second output node to the reference voltage during the charge phase; and a generator for generating the first, second and third control phase signals for alternately connecting the respective second terminals of said pump capacitors to the supply voltage and to their respective output nodes, for connecting the first terminal of said pump capacitor to the reference voltage and to the supply voltage of said first stage clock booster, respectively, said generator also a) charging in parallel at the supply voltage said pump capacitors of both stages, and grounding the respective output node of each stage, b) isolating the respective output node of each stage, and connecting said pump capacitor in each stage to their respective output node so that said pump capacitors are in series, c) connecting the first terminal of said pump capacitor of said first stage to the supply voltage when the second boosted clock voltage is being produced on the second output node of said second stage, and d) performing in reverse order steps b) and a) for grounding the respective output nodes of each stage.

7. A two-stage clock booster according to claim 6, wherein the reference voltage comprises ground.

8. A two-stage clock booster according to claim 6, wherein said first and second switches in each stage each comprises a low-voltage MOS transistor having a first type of conductivity; and wherein said third switch in each stage comprises a MOS low-voltage transistor having a second type of conductivity, said MOS transistor having the second type of conductivity comprising a gate terminal connected to a constant voltage, and a conducting terminal receiving the third control phase signal.

9. A two-stage clock booster according to claim 8, wherein said MOS transistor having the first type of conductivity comprises a PMOS transistor; and wherein said MOS transistor having the second type of conductivity comprises an NMOS transistor, with the conducting terminal thereof comprising a source terminal.

10. A two-stage clock booster according to claim 6, wherein said switching circuit in each stage comprises:

first and second complementary transistors connected in parallel between the control node of said second switch and the first terminal of said pump capacitor, said first transistor being controlled by the second control phase signal and said second transistor being controlled by a negated replica of the second control phase signal; and a third transistor having a conductivity opposite to a conductivity to said first transistor and being controlled by the second phase control signal, said third transistor being connected between the control node of said second switch and a supply node receiving the supply voltage.

11. A multi-stage clock booster for producing on an output node a boosted clock voltage that is a multiple of a supply voltage, the multi-stage clock booster comprising:

a first stage clock booster for producing a first boosted clock voltage on a first output node that is a multiple of the supply voltage, said first stage clock booster comprising a pump capacitor having a first terminal being driven by a first control phase signal, and a second terminal, a first switch controlled by the first boosted clock voltage for connecting the second terminal of said pump capacitor to the supply voltage during a charge phase, a second switch for connecting the second terminal of said pump capacitor to the first output node during a boosted clock voltage output phase, said second switch having a control node, a switching circuit for alternately connecting the control node of said second switch to the supply voltage and to the first terminal of said pump capacitor, said switching circuit being driven by a second control phase signal, and a third switch controlled by a third control phase signal for connecting the first output node to a reference voltage during the charge phase;

a plurality of additional stage clock boosters connected in cascade to each other and to said first stage clock booster, each additional clock booster stage for producing a boosted clock voltage on a respective output node that is a multiple of the supply voltage, each additional stage clock booster comprising a pump capacitor having a first terminal connected to the output node of a previous stage clock booster and being driven by the boosted clock voltage produced by the previous stage, and a second terminal, a first switch controlled by the boosted clock voltage produced by the previous stage for connecting the second terminal of said pump capacitor to the second terminal of said pump capacitor of the previous stage during the charge phase, said first switch being connected to a supply node coinciding with the second terminal of said pump capacitor of the previous stage, a second switch for connecting the second terminal of said pump capacitor to the output node of its respective stage during the boosted clock voltage output phase, and having a control node, a switching circuit for alternately connecting the control node to the supply voltage and to the first terminal of said pump capacitor, said switching circuit being driven by the second control phase signal, a third switch controlled by the third control phase signal for connecting the output node of its respective stage to a reference voltage during the charge phase; and a generator for generating the first, second and third control phase signals for alternately connecting the respective second terminals of said pump capacitors to the supply voltage and to the respective output nodes, and for connecting the first terminal of said pump capacitor to the reference voltage and to the supply voltage of said first stage clock booster, respectively, said generator also a) charging in parallel at the supply voltage the pump capacitors of all stages and grounding the respective output node of each stage,
b) isolating the respective output nodes and connecting said pump capacitors to the output node in its respective stage so that said pump capacitors are in series to each other,
c) connecting the first terminal of said pump capacitor of said first stage to the supply voltage when the boosted voltage is being produced on the output node of a last stage, and
d) performing in a reverse order steps b) and a) for grounding the respective output nodes.

12. A multi-stage clock booster according to claim 11, wherein the reference voltage comprises ground.

13. A multi-stage clock booster according to claim 11, wherein said first and second switches in each stage each comprises a low-voltage MOS transistor having a first type of conductivity; and wherein said third switch in each stage comprises a MOS low-voltage transistor having a second type of conductivity, said MOS transistor having the second type of conductivity and comprising a gate terminal connected to a constant voltage, and a conducting terminal receiving the third control phase signal.

14. A multi-stage clock booster according to claim 13, wherein said MOS transistor having the first type of conductivity comprises a PMOS transistor; and wherein said MOS transistor having the second type of conductivity comprises an NMOS transistor, with the conducting terminal thereof comprising a source terminal.

15. A multi-stage clock booster according to claim 11, wherein said switching circuit in each stage comprises:
first and second complementary transistors connected in parallel between the control node of said second switch and the first terminal of said pump capacitor, said first transistor being controlled by the second control phase signal and said second transistor being controlled by a negated replica of the second control phase signal; and
a third transistor having a conductivity opposite to a conductivity to said first transistor and being controlled by the second phase control signal, said third transistor being connected between the control node of said second switch and a supply node receiving the supply voltage.

16. A method for producing a boosted clock voltage on an output node of a single-stage clock booster, the boosted clock voltage being a multiple of a supply voltage, the method comprising:
driving a first terminal of a pump capacitor with a first control phase signal;
controlling a first switch with the boosted clock voltage for connecting a second terminal of the pump capacitor to the supply voltage during a charge phase;
operating a second switch for connecting a second terminal of the pump capacitor to the output node during a boosted clock voltage output phase;
operating a switching circuit for alternately connecting a control node of the second switch to the supply voltage and to the first terminal of the pump capacitor, the switching circuit being driven by a second control phase signal;
operating a third switch controlled by a third control phase signal for connecting the output node to a reference voltage during the charge phase; and
generating the first, second and third control phase signals for alternately connecting the second terminal of said pump capacitor to the supply voltage and to the output node, and for connecting the first terminal of the pump capacitor to the reference voltage and to the supply voltage, respectively.

17. A method according to claim 16, wherein the reference voltage comprises ground.

18. A method according to claim 16, wherein the first and second switches each comprise a low-voltage MOS transistor having a first type of conductivity; and wherein the third switch comprises a MOS low-voltage transistor having a second type of conductivity, the MOS transistor having the second type of conductivity comprising a gate terminal connected to a constant voltage, and a conducting terminal receiving the third control phase signal.

19. A method according to claim 18, wherein the MOS transistor having the first type of conductivity comprises a PMOS transistor; and wherein the MOS transistor having the second type of conductivity comprises an NMOS transistor, with the conducting terminal thereof comprising a source terminal.

20. A method according to claim 16, wherein the switching circuit comprises:
first and second complementary transistors connected in parallel between the control node of the second switch and the first terminal of the pump capacitor, the first transistor being controlled by the second control phase signal and the second transistor being controlled by a negated replica of the second control phase signal; and
a third transistor having a conductivity opposite to a conductivity to the first transistor and being controlled by the second phase control signal, the third transistor being connected between the control node of the second switch and a supply node receiving the supply voltage.

* * * * *